C. WILKERSON.
MOTOR VEHICLE.
APPLICATION FILED MAR. 27, 1914.
1,174,216.
Patented Mar. 7, 1916.
2 SHEETS—SHEET 2.
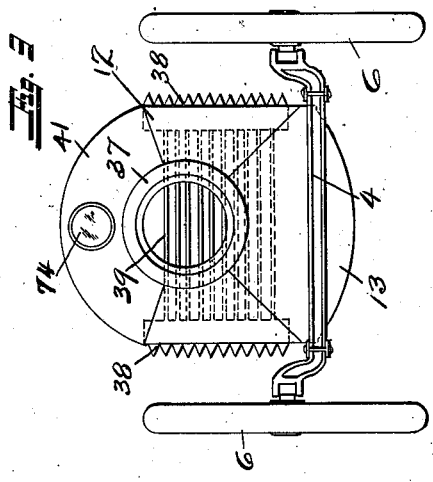
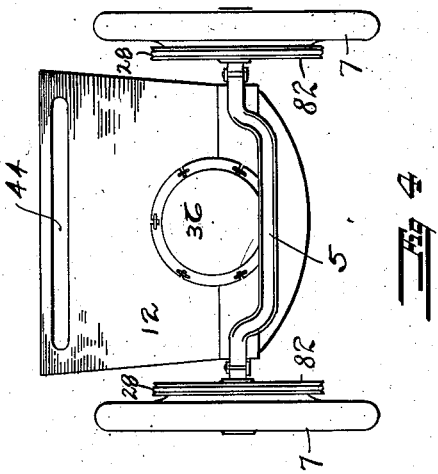
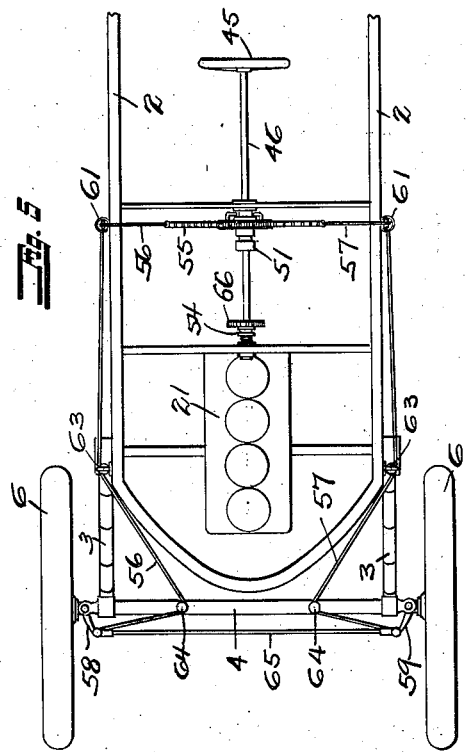
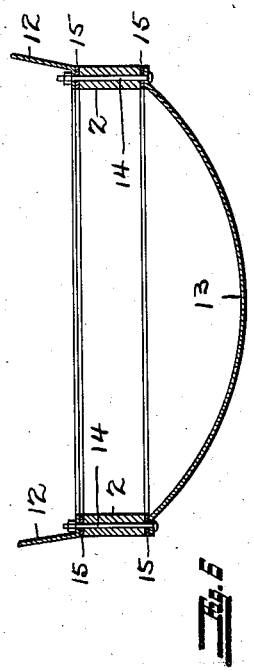
WITNESSES:
H. G. Frost
J. B. Gardner
INVENTOR.
CLYDE WILKERSON
BY Miller & White
his ATTORNEYS.

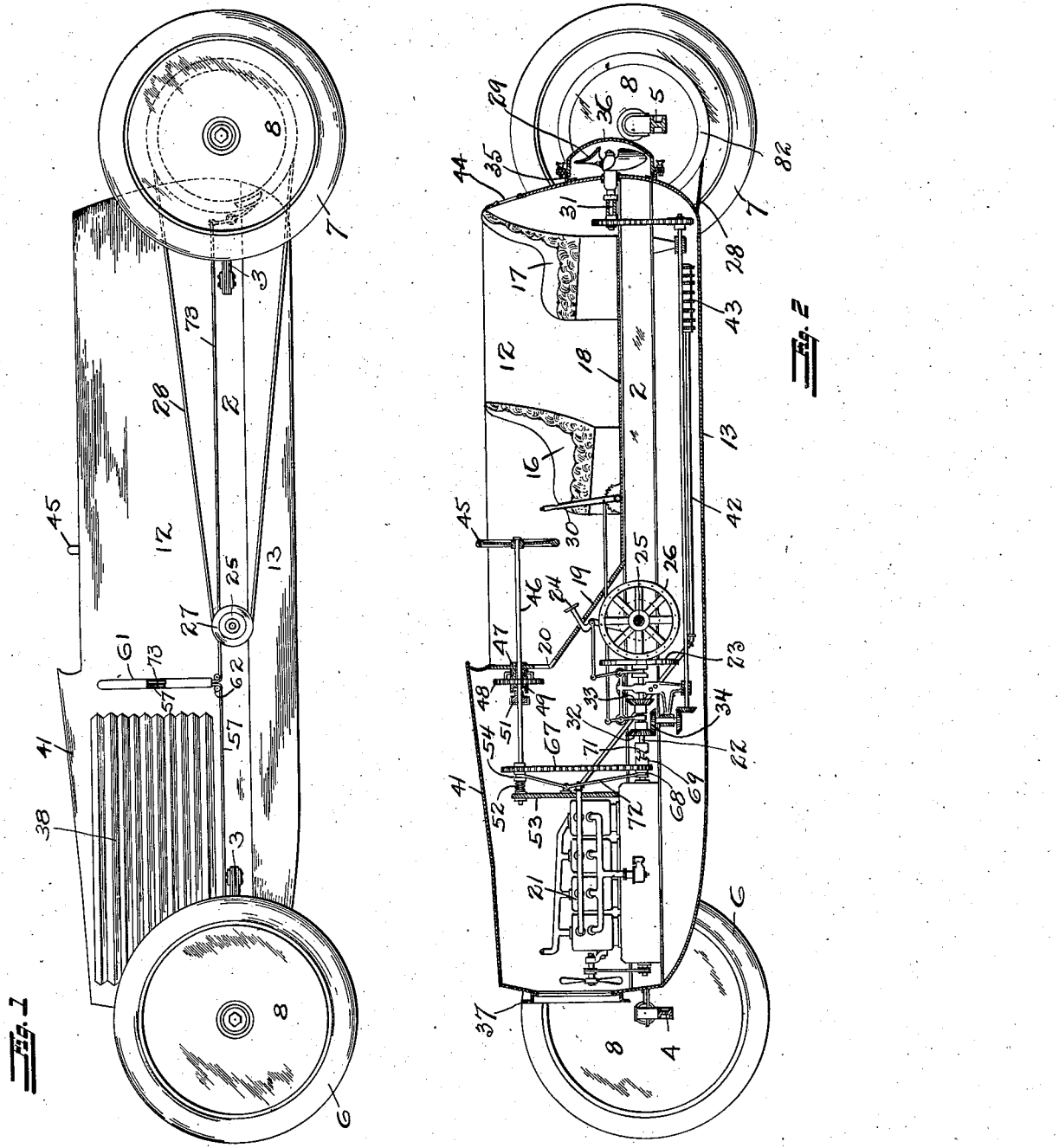

UNITED STATES PATENT OFFICE.

CLYDE WILKERSON, OF SAN FRANCISCO, CALIFORNIA.

MOTOR-VEHICLE.

1,174,216.  Specification of Letters Patent.  Patented Mar. 7, 1916.

Application filed March 27, 1914. Serial No. 827,554.

*To all whom it may concern:*

Be it known that I, CLYDE WILKERSON, a citizen of the United States, and a resident of the city and county of San Francisco, State of California, have invented certain new and useful Improvements in Motor-Vehicles, of which the following is a specification.

The invention relates to motor vehicles which are adapted to travel on both land and water.

The object of the invention is to provide a practical motor vehicle for travel either on land or water.

Another object of the invention is to provide a vehicle which may be quickly changed from a land traveling vehicle to a water traveling vehicle and vice versa.

A further object of the invention is to provide a common steering mechanism for both land and water travel.

Another object of the invention is to provide a simple means for starting the internal combustion engine which drives the vehicle when the vehicle is either on land or in the water.

The invention possesses other advantageous features, which, with the foregoing, will be set forth at length in the following description where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description, as I may adopt many variations within the scope of my invention as set forth in said claims.

Referring to the drawings: Figure 1 is a side view of the vehicle of my invention. Fig. 2 is a longitudinal vertical section of the vehicle of my invention. Fig. 3 is a front view of the vehicle arranged for land travel. Fig. 4 is a rear view of the vehicle arranged for land travel. Fig. 5 is a plan view of the front portion of the vehicle chassis. Fig. 6 is a cross section of the lower portion of the vehicle body. Fig. 7 is a fragmentary section of the rear of the vehicle showing the propeller.

The vehicle of my invention has, when traveling on land, the general appearance of a cycle car, since I prefer to construct it of such size rather than of the general dimensions of an automobile. The cycle car body is narrower in proportion to its length, than the automobile body, and this feature renders it more advantageous for use as a boat.

The vehicle of my invention consists of a frame or chassis comprising the side rails 2 and suitable cross members for producing the required strength and rigidity. Secured to the side rails 2 by means of the springs 3 are the front and rear axles 4 and 5, on which are respectively mounted the guiding and driving wheels 6 and 7. The wheels 6 and 7 are preferably formed with wire spokes, which are covered by the sheet metal plates 8 which are preferably attached in such manner that they are removable. The plates cover the spokes, thereby causing the wheels to cause less disturbance in passing through the water. The front wheels 6 are used for guiding the vehicle both on land and in the water, and in order that the proper guiding effect may be obtained in the water, it is desirable that the spokes be inclosed by the metal disks 8.

Mounted on the frame or chassis, is the body of the vehicle which consists of two parts, the upper part 12, or body proper, and the lower part or bottom 13. Since the vehicle is to travel on water it is apparent that the portion of the body which occurs below the water line must be water-tight. The upper and lower portions of the body, or in other words, the body and the bottom, are preferably made of sheet metal, the joints in which are tight. The bottom 13 is curved or concave in shape and slopes upward toward the front and is secured to the side rails by means of the bolts 14. These bolts pass through the side rails, which are preferably formed of wood, and also clamp the body 12 thereto. Arranged between the side rails and the body and the bottom are gaskets 15, by which the joint is tightly sealed. The body extends upward above the water line and no doors or apertures are formed therein below such line, so that the practicability of the boat construction is assured. Arranged within the the driver's and passenger's seats 16 and 17, below which is arranged a tight floor 18, extending from the dash 19 to the rear of the passenger's seat 17.

In a vehicle which is adapted to travel both on land and water, and which is driven by an internal combustion engine, there are several problems which must be overcome, which are inherent in the construction of a practical vehicle. If it were not for the different conditions under which the vehicle must operate, these problems would not be presented, since they only occur in combination with the convertible feature of the vehicle. Means must be provided for driving the vehicle, both on land and water, means must be provided for steering the vehicle under both conditions of travel, means must be provided for starting the engine when the vehicle is either on land or water, means must be provided for cooling the engine under both conditions of travel, and means must be provided for disposing of the gases of combustion. The means or their equivalent which have been provided for accomplishing these various results are not separate and independent inventions, but form part of the complete whole and are necessary to a practical operative vehicle.

Arranged on the chassis at its forward end, is an internal combustion engine 21 of any standard or suitable construction from which power is derived for driving the vehicle. Splined to the drive shaft 22 of the engine is a friction disk 23, which is movable longitudinally of the shaft by means of the pedal 24. The friction disk 23 is engaged by the friction wheel 26, splined to the jack shaft or cross shaft 25, which shaft extends through the side rails in water tight bushings and is provided on its ends with drive pulleys 27 which are connected to the rear wheels by means of belts 28. The friction transmission shown is of the usual type and is advantageous in vehicles of this nature on account of its comparative lightness. The friction wheel 26 is movable longitudinally of the shaft 25, so that it may engage the friction disk at various distances from the center, thereby producing different speed ratios of engine and rear wheel, and the disk 23 is movable toward and from the wheel 26, so that it may be moved out of contact therewith, when it is desirable to drive the vehicle in the water.

Arranged at the rear of the body is a propeller 29, mounted on a shaft 31 which passes through the body wall in a water tight bushing. The propeller shaft is driven from the engine, but on account of the fact that the resistance to travel through water is substantially constant, no means are provided for varying the propeller speed in proportion to the engine speed. Splined to the drive shaft 22 is a sleeve carrying two oppositely placed bevel gears 32—33, between which is arranged a bevel gear 34 which is connected by suitable gears, shafts, sprockets and chains with the propeller shaft. When the gear 34 is out of mesh with both gears 32 and 33, the power from the engine is not transferred to the propeller, and when either of said gears 32 or 33 are in mesh with gear 34, the vehicle will be propelled either forward or backward, depending upon which gear is enmeshed. The sleeve carrying gears 32 and 33 is moved and held in any particular position by means of the lever 30, arranged at the driver's seat.

Surrounding the propeller and attached to the rear of the body is a flanged ring 35, to which may be clamped a cap 36, thereby completely inclosing the propeller when the vehicle is traveling on land. The cap may be held in place by bolts or other means which are quickly removable. At the front end of the body is a similar flanged ring 37 of the same size as ring 35, surrounding an opening or aperture in the front wall of the body. This opening is for the purpose of allowing air to sweep the engine and the cooling system, and keep the engine cool. This aperture in the front of the body is open when the vehicle is operating on land, but when it is to be driven into the water, the cap 36 is removed from the rear ring 35 and is secured to the front ring 37, forming a water tight joint. When the body front is closed, air to support combustion in the engine may be admitted through an aperture 20 in the dash 19, which may be closed, when the front of the body is opened.

Means must be provided for cooling the engine both on land and water. Since water is always colder than air, the same cooling effect may be obtained by exposing less of the surface of the cooling system to water than to air. Arranged on opposite sides of the body at that part which incloses the engine, are receptacles or containers 38 having irregular outer surfaces, so that a large superficial area is presented to the passing air or water. The containers or radiators 38 are connected together by a plurality of tubes 39 extending across the body and adapted to be swept by the air entering the aperture in the front thereof when the vehicle is traveling on land. The radiator tanks are arranged on opposite sides of the body, allowing access to the engine by removing the upper portion of the hood 41. The water jacket of the engine is suitably connected to the radiator.

The exhaust gases of the engine must be disposed of without causing discomfiture to the persons in the vehicle. To accomplish this the passenger compartment of the body is separated from the remainder of the body by the floor 18 which terminates at the back of the rear seat. The back of the body is spaced from the back of the rear seat, forming a chamber between the floor and the bottom. The gases of combustion are conveyed from the engine, through the pipe 42 to the muffler 43, whence they are discharged. They then pass upward between the body and back of the rear seat and are discharged through the aperture 44 in the rear of the body. The aperture 44 is placed to occur above the water line, when the vehicle is in the water. Since the body is entirely closed, some means must be provided for disposing of the cooling air which enters the front of the body, when the vehicle is traveling on land. This heated air passes between the floor 18 and the bottom of the body and is discharged through the aperture 44.

The vehicle is guided from the steering wheel 45 arranged adjacent the driver's seat. The wheel 45 is attached to the steering rod 46, which is capable of longitudinal movement for reasons which will hereafter be described. The rod 46 passes through a bushing 47 having an annular groove therein and loosely carries a sprocket wheel 48 which is provided with fingers engaging in said groove. The sprocket wheel 48 is provided on its opposite side with a clutch face 49 which is adapted to be normally engaged by a clutch member 51 secured to the rod 46. The rod 46 is normally held in its rearward position by means of the spring 52 which is interposed between the fixed support 53 and the collar 54 fixed to the rod, so that the sprocket wheel 48 normally rotates with the rod. Engaging the sprocket is a chain 55, which is secured at its ends to cables 56 and 57 which are connected to the opposite steering knuckles 58—59. The cables pass over pulleys arranged in the side of the body and down through tubes 61 arranged on the outside of the body, whence they pass over other pulleys 62 and 63 and around the pulleys 64 on the front axle, to the steering knuckles. The steering knuckles are directly connected together by the reach rod 65, so that the front wheels are constrained to swing in unison. The pulleys 64 on the front axle are arranged toward the center of the axle, so that the proper direction of pull of the knuckles is obtained. This arrangement provides an efficient and simple steering mechanism which is particularly adapted to a vehicle in which water tightness of the body must be preserved below a certain line.

It is essential that some means be provided for starting the engine when the vehicle is in the water and on account of the nature of the vehicle, the present day electric starting systems are too heavy and the use of the ordinary hand crank is impossible. This problem I have solved by providing means whereby the steering wheel 45 may be disconnected from the front wheels of the vehicle and connected to the drive shaft of the engine, so that the steering wheel may be employed for starting the engine. I have stated before that the rod 46 was movable longitudinally, and that normally it is held in its rear position by means of the spring 52 engaging the collar 54 fixed on the rod. Secured to this collar is a sprocket wheel 66 which is engaged by the chain 67 which passes over a sprocket formed on the collar 68 which is slidably and loosely mounted on the engine drive shaft. The collar 68 is provided with a clutch member 69 having inclined teeth which is adapted to engage a similar clutch member 71 fixed to the drive shaft. Engaging collars 54 and 68 and pivoted intermediate its ends on the fixed support 53 is a lever 72, which transfers the longitudinal movement of collar 54 to collar 68. When the steering wheel is pushed forward, the clutch members 51 and 49 become disengaged, thereby releasing the steering mechanism, and clutch members 69 and 71 are brought into mesh, so that the steering wheel is directly connected to the engine shaft. The steering wheel, therefore, serves the same purpose as a crank, and a quick rotation thereof will start the engine. As soon as the engine starts, the clutch members 69 and 71 are forced apart, so that the motion of the engine is not transferred to the steering wheel. The wheel is then pulled backward, and the steering mechanism becomes engaged.

The complete vehicle simulates an automobile or cycle-car very closely in appearance and is a very efficient and comfortable vehicle for traveling both on land and water. Fenders may be arranged over the wheels and driving belts when desired.

The movement of the vehicle when traveling on land may be stopped by means of brake shoes engaging the driving pulleys 82 on the rear wheels. The brake shoes are operated by the cables 73, which are connected within the body to a suitable foot or hand lever and which pass through the tubes 61 and thence to the brake shoe levers.

The gasolene for furnishing the motive power is preferably carried in narrow interconnected tanks arranged at the sides of the body 12. Suitable lamps for illumination at night may be placed in suitable positions, the head light 74 being preferably arranged at the center of the front of the body.

I claim:

1. In a motor vehicle of the class described, a body having a water-tight bottom and sides, a floor dividing the body into two compartments, the lower compartment terminating at its rear end adjacent the upper edge of the body, said body being provided at the rear adjacent the upper edge with an aperture opening into said lower compartment.

2. In a motor vehicle of the class described, a body having a water-tight bottom and sides, a motor arranged at the forward end of said body, a floor dividing the body into upper and lower compartments, seats arranged in the upper compartment, the motor and transmission mechanism being arranged in the lower compartment, and an outlet to said lower compartment arranged at the rear of the body adjacent its upper edge.

3. In a motor vehicle of the class described, a water-tight body, a floor dividing said body into two compartments, passenger seats arranged in one compartment, a motor and transmission mechanism arranged in the other compartment, said floor terminating at the rear end of the rear seat, whereby an upward extension of said latter compartment is produced between the rear wall of said seat and the rear wall of the body, said rear wall being provided with a discharge opening adjacent its upper edge.

4. In a motor vehicle of the class described, a water-tight body, a floor dividing said body into two compartments, a motor and transmission mechanism arranged in the lower compartment, the front wall of said compartment being provided with a closable aperture and the rear wall of said compartment being provided with an aperture arranged adjacent the upper edge of the vehicle body.

5. In a motor vehicle of the character described, a water-tight body, means for propelling said vehicle, webbed guiding wheels arranged at the front of said vehicle, a steering wheel arranged within said body, a sprocket connected to said steering wheel, a chain engaging said sprocket, cables connecting the opposite ends of said chain with the respective guiding wheels, said cables passing through the body adjacent the upper edge thereof and tubes arranged on the outside of the body through which said cables pass.

6. In a motor vehicle of the character described, a steering wheel, a longitudinally movable rod on which said wheel is mounted, a sprocket adapted to be connected to said rod, guiding wheels, means connecting said guiding wheels with said sprocket, an internal combustion engine having a drive shaft, means adapted to connect said drive shaft with said rod, and means operative by the longitudinal movement of said rod for disconnecting said rod from said sprocket and connecting it to said drive shaft.

7. In a motor vehicle of the character described, a water-tight body having an aperture therein at the front end, a flanged ring encircling said aperture, a propeller at the rear end of the body, a flanged ring of the same size surrounding said propeller and a cap adapted to be secured to either of said flanged rings.

8. In a motor vehicle of the character described, a water-tight body, a propeller arranged at the rear end of said body, a flanged ring secured to said body and surrounding said propeller and a cap removably attached to said ring.

In testimony whereof, I have hereunto set my hand at San Francisco, California, this 19th day of March 1914.

CLYDE WILKERSON.

In presence of—
H. G. Prost,
M. Le Conte.